US010467279B2

(12) United States Patent
Moore et al.

(10) Patent No.: US 10,467,279 B2
(45) Date of Patent: Nov. 5, 2019

(54) SELECTING DIGITAL CONTENT FOR INCLUSION IN MEDIA PRESENTATIONS

(71) Applicant: GoPro, Inc., San Mateo, CA (US)

(72) Inventors: Stephen Trey Moore, San Antonio, TX (US); Augustine Vidal Pedraza, IV, San Antonio, TX (US); Florian Denis, Paris (FR); Jean Caillé, Paris (FR)

(73) Assignee: GoPro, Inc., San Mateo, CA (US)

( * ) Notice: Subject to any disclaimer, the term of this patent is extended or adjusted under 35 U.S.C. 154(b) by 102 days.

(21) Appl. No.: 15/358,773

(22) Filed: Nov. 22, 2016

(65) Prior Publication Data

US 2017/0075886 A1 Mar. 16, 2017

Related U.S. Application Data

(63) Continuation-in-part of application No. 15/100,887, filed as application No. PCT/US2014/067864 on Dec. 1, 2014.

(Continued)

(51) Int. Cl.
*G06F 16/438* (2019.01)
*G06F 3/0484* (2013.01)
*G06F 16/44* (2019.01)

(52) U.S. Cl.
CPC ........ *G06F 16/438* (2019.01); *G06F 3/04842* (2013.01); *G06F 16/44* (2019.01)

(58) Field of Classification Search
CPC ........... G06F 17/30056; G06F 17/3005; G06F 17/30058; G06F 17/30247;

(Continued)

(56) References Cited

U.S. PATENT DOCUMENTS 8,595,317 B1 11/2013 Harris et al.
8,913,152 B1 * 12/2014 Carceroni ............... G06T 11/60
  348/222.1

(Continued)

FOREIGN PATENT DOCUMENTS

WO WO2015084702 A1 6/2015

OTHER PUBLICATIONS

Authorized officer Shane Thomas, International Search Report/ Written Opinion in PCT/US2014/067864 dated Mar. 2, 2015, 14 pages.

(Continued)

*Primary Examiner* — Angie Badawi
(74) *Attorney, Agent, or Firm* — Esplin & Associates, PC

(57) ABSTRACT

Implementations of the present disclosure are generally directed to receiving, a plurality of items of digital content from one or more data sources associated with a user, providing a plurality of clusters of digital content, each cluster including one or more items of digital content of the plurality of items of digital content, for a cluster: determining a goodness measure for each item of digital content within the cluster, the goodness measure being at least partially based on metadata associated with a respective item of digital content, and selecting at least one item of digital content from the cluster for inclusion in the media presentation, and providing the media presentation for display on a computing device of the user, the media presentation including the at least one item of digital content.

20 Claims, 4 Drawing Sheets

Related U.S. Application Data

(60) Provisional application No. 61/910,823, filed on Dec. 2, 2013, provisional application No. 61/910,839, filed on Dec. 2, 2013.

(58) Field of Classification Search
CPC ......... G06F 17/30038; G06F 17/30244; G06F 3/04842; G06F 16/438; G06F 16/44
See application file for complete search history.

(56) References Cited

U.S. PATENT DOCUMENTS

| | | | | |
|---|---|---|---|---|
| 9,235,575 | B1* | 1/2016 | Xiao | G06F 17/30056 |
| 9,465,521 | B1* | 10/2016 | Giordano | G06F 3/0484 |
| 2003/0048950 | A1* | 3/2003 | Savakis | G06F 17/30247 |
| | | | | 382/225 |
| 2004/0128308 | A1* | 7/2004 | Obrador | G06F 17/30056 |
| 2007/0103565 | A1* | 5/2007 | Xu | G06F 17/30265 |
| | | | | 348/231.2 |
| 2007/0211151 | A1* | 9/2007 | Baiping | G06F 17/30244 |
| | | | | 348/231.2 |
| 2007/0271297 | A1* | 11/2007 | Jaffe | G06F 17/30041 |
| 2008/0215984 | A1* | 9/2008 | Manico | G06F 17/30035 |
| | | | | 715/730 |
| 2008/0275893 | A1 | 11/2008 | Bodin et al. | |
| 2008/0282156 | A1* | 11/2008 | Skicewicz | G06F 17/30056 |
| | | | | 715/273 |
| 2008/0304808 | A1* | 12/2008 | Newell | G06F 17/30029 |
| | | | | 386/278 |
| 2011/0205399 | A1* | 8/2011 | Gao | G06F 17/30056 |
| | | | | 348/231.99 |
| 2011/0276864 | A1* | 11/2011 | Oules | G06F 17/30017 |
| | | | | 715/202 |
| 2013/0011083 | A1* | 1/2013 | Berkovich | G06F 17/30244 |
| | | | | 382/305 |
| 2013/0051670 | A1* | 2/2013 | Das | G06F 17/30056 |
| | | | | 382/170 |
| 2013/0110978 | A1 | 5/2013 | Gordon | |
| 2013/0155088 | A1* | 6/2013 | Wang | G06T 1/0007 |
| | | | | 345/581 |
| 2013/0271470 | A1 | 10/2013 | Moore et al. | |
| 2014/0172856 | A1* | 6/2014 | Imbruce | G06F 17/212 |
| | | | | 707/737 |
| 2014/0188890 | A1* | 7/2014 | Clifton | G06F 17/30268 |
| | | | | 707/740 |
| 2015/0161147 | A1* | 6/2015 | Zhao | G06F 17/3079 |
| | | | | 707/772 |
| 2015/0170333 | A1* | 6/2015 | Jing | G06T 3/40 |
| | | | | 345/660 |
| 2015/0363409 | A1* | 12/2015 | Wood | G06F 16/44 |
| | | | | 707/738 |
| 2016/0004695 | A1* | 1/2016 | Yang | G06F 17/30247 |
| | | | | 707/738 |
| 2016/0054845 | A1* | 2/2016 | Takahashi | G06F 3/0488 |
| | | | | 345/173 |
| 2016/0283483 | A1* | 9/2016 | Jiang | G06F 17/3053 |
| 2016/0308847 | A1 | 10/2016 | Moore et al. | |

OTHER PUBLICATIONS

Authorized officer Simin Baharlou, International Preliminary Report on Patentability in PCT/US2014/067864 dated Jun. 16, 2106, 6 pages.

* cited by examiner

SELECTING DIGITAL CONTENT FOR INCLUSION IN MEDIA PRESENTATIONS

CROSS-REFERENCE TO RELATED APPLICATIONS

This application is a continuation-in-part of, and claims the benefit of U.S. application Ser. No. 15/100,887, filed on Jun. 1, 2016, which is a U.S. national phase application of PCT/US2014/067864, which claims the benefit of U.S. App. No. 61/910,823, filed on Dec. 2, 2013, and U.S. App. No. 61/910,839, filed Dec. 2, 2013, the disclosures of each are expressly incorporated herein by reference in their entireties for all purposes.

BACKGROUND

Users interact with multiple computer-implemented services to produce a variety of digital content. For example, users can use a social networking service to post (share) digital content (e.g., text, video, images) with other users, can use a video-sharing service to post digital content, and/or can use an image-sharing service to post digital content. Further, users can use devices (e.g., smartphones, cameras) to capture digital content (e.g., videos, images). Consequently, the digital content generated by a user can be dispersed across multiple computer-implemented systems and/or devices.

SUMMARY

This specification relates to presentation of content received from a plurality of data sources. More particularly, this specification relates to selecting digital content for inclusion in a media presentation.

In general, innovative aspects of the subject matter described in this specification can be embodied in methods that include actions of receiving, a plurality of items of digital content from one or more data sources associated with a user, providing a plurality of clusters of digital content, each cluster including one or more items of digital content of the plurality of items of digital content, for a cluster: determining a goodness measure for each item of digital content within the cluster, the goodness measure being at least partially based on metadata associated with a respective item of digital content, and selecting at least one item of digital content from the cluster for inclusion in the media presentation, and providing the media presentation for display on a computing device of the user, the media presentation including the at least one item of digital content. Other implementations of this aspect include corresponding systems, apparatus, and computer programs, configured to perform the actions of the methods, encoded on computer storage devices.

These and other implementations can each optionally include one or more of the following features: providing the plurality of clusters of digital content includes providing respective clusters based on metadata of the digital content; actions further include, for the cluster: identifying two or more items of digital content as redundant digital content, and removing an item of redundant digital content from inclusion in the media presentation; identifying two or more items of digital content as redundant digital content is performed based on one or more of an overlap in metadata, and a difference in respective goodness measures; removing an item of redundant digital content from inclusion in the media presentation is performed in response to determining that a goodness measure of at least one item of redundant digital content does not meet a threshold goodness measure; the goodness measure is further determined based on content of the respective item of digital content; providing a plurality of clusters of digital content includes processing the plurality of items of digital content based on one or more metadata values, each cluster corresponding to a respective metadata value; the one or more metadata values include time, location, duration, keyword, and type; items of digital content include images, videos and/or text; at least one data source is associated with a computer-implemented service accessed by the user; and at least one data source includes the computing device of the user.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
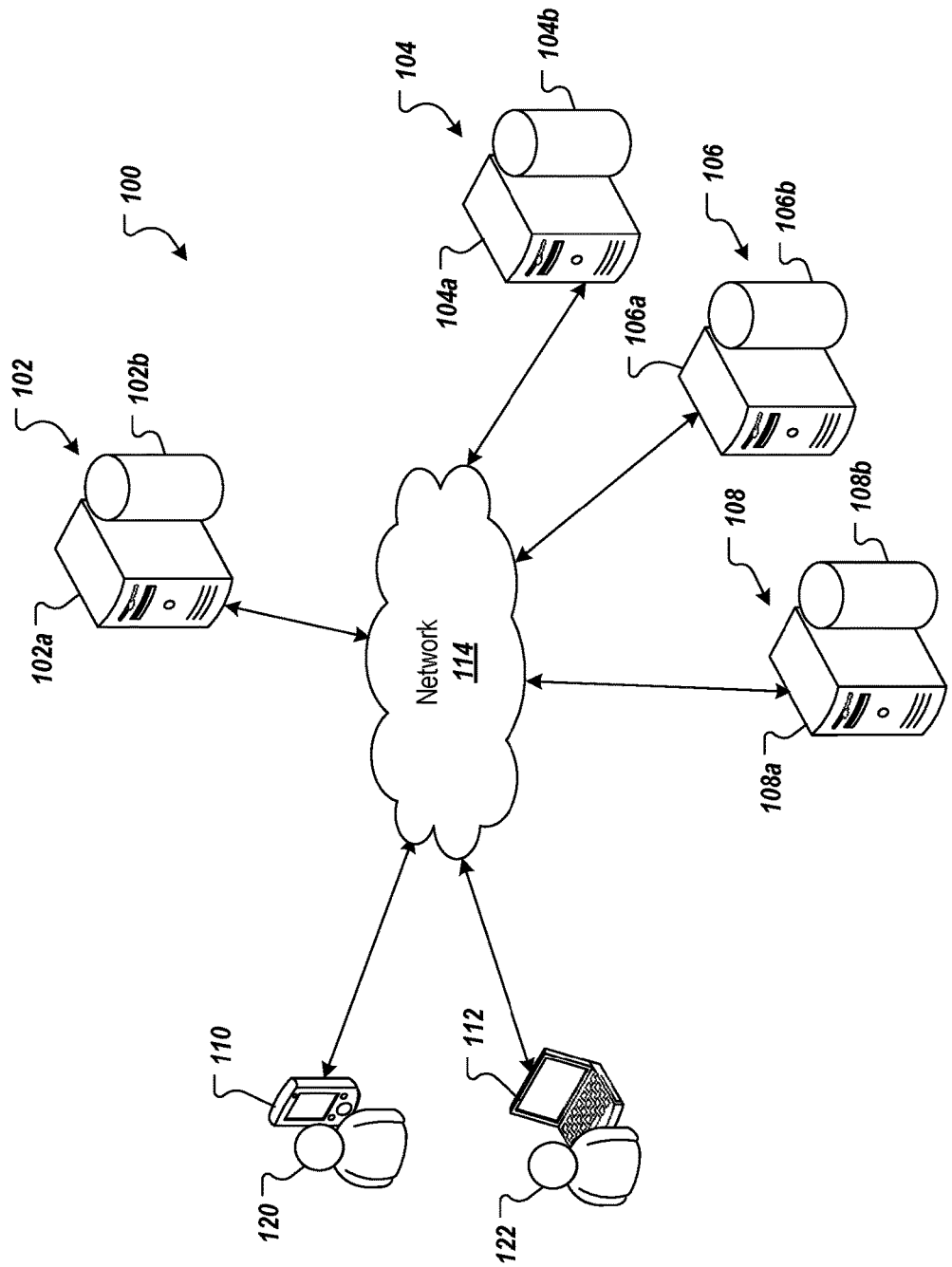
FIG. 1 depicts an example environment in which users can interact with one or more computer-implemented services.

Implementations of the present disclosure are generally directed to generating media presentations based on digital content that is aggregated from one or more data sources. More particularly, implementations of the present disclosure are directed to selecting digital content for inclusion in a media presentation. Implementations include receiving digital content from one or more data sources, processing the digital content to provide a set of digital content, and providing a media presentation that includes digital content of the set of digital content. In some implementations, the media presentation is automatically provided in response to user input. In some implementations, data sources of the one or more data sources include social networking data sources associated with respective computer-implemented social networking services. In some implementations, data sources of the one or more data sources include content-sharing data sources associated with respective computer-implemented content-sharing services. In some implementations, data sources of the one or more data sources include one or more computing devices associated with a user. In some implementations, a media presentation is automatically updated. In some examples, the media presentation is automatically updated in response to digital content being added to a data source of the one or more data sources.

In some implementations, digital content received from the one or more data sources is processed based on one or more parameters. In some examples, a parameter can be provided as metadata that is associated with the digital content. Example parameters can include type (e.g., image, video), duration, time, keyword, location, and collection.

For example, time can correspond to a time at and/or a time range within which digital content was created and/or distributed (e.g., in a social networking service, in a content-sharing service). As another example, duration can indicate a length of a video. Example keywords can include pre-fixed words and/or phrases, such as hashtags. In some examples, pre-fixed words/phrases enable content to be grouped and/or identified based on one or more pre-fixed words/phrases associated therewith. In some examples, location can correspond to a location at and/or from which digital content was created and/or distributed (e.g., in a social networking service, in a content-sharing service). In some examples, a collection can include a user-made grouping of digital content (e.g., an "album" of photos).

In some implementations, the digital content can be filtered based on the one or more parameters for inclusion in a set of digital content associated with a particular presentation. In some examples, digital content that does not correspond to the one or more parameters of the particular presentation is not included in the set of digital content for the particular presentation.

In some implementations, digital content can be filtered based on one or more quality indicators. In some examples, digital content that does not correspond to or meet thresholds of the one or more quality indicators is not included in the set of digital content for the particular presentation.

FIG. 1 depicts an example environment 100, in which implementations of the present disclosure can be provided. In some examples, the environment 100 enables users to interact with one or more computer-implemented services. Example computer-implemented services can include social networking services, content-sharing services, micro-blogging services, and the like. In some examples, computer-implemented services enable users to distribute digital content to other users. Example digital content can include images, videos, and text. Implementations of the present disclosure are directed to a computer-implemented presentation service that provides presentations based on digital content provided from one or more other computer-implemented services, and/or a computing device of a user.

Implementations of the present disclosure will be discussed in further detail with reference to an example context. The example context includes a computer-implemented social networking service, a computer-implemented micro-blogging service, a computer-implemented content-sharing service, and digital content provided from a computing device (e.g., a smartphone with camera, a video camera, a computer having digital content stored thereon). An example social networking service can include Facebook® provided by Facebook, Inc. An example micro-blogging service can include Twitter® provided by Twitter Inc. Example content-sharing services include image-sharing services and/or video-sharing services. An example content-sharing service includes Instagram® provided by Facebook, Inc. It is appreciated, however, that implementations of the present disclosure can be realized in any appropriate contexts (e.g., multiple social networking services, multiple micro-blogging services, multiple content-sharing services, and/or any other appropriate computer-implemented service).

With continued reference to FIG. 1, the example environment 100 includes a computing system 102, a computing system 104, a computing system 106, a computing system 108, a computing device 110, a computing device 112, and a network 114. In some examples, the computing systems 102, 104, 106, 108 include respective computing devices 102a, 104a, 106a, 108a and computer-readable memory provided as a persistent storage device 102b, 104b, 106b, 108b, and can represent various forms of server systems including, but not limited to a web server, an application server, a proxy server, a network server, or a server farm.

The computing devices 110, 112 are associated with respective users 120, 122. In some examples, the computing devices 110, 112 can each include various forms of a processing device including, but not limited to, a desktop computer, a laptop computer, a tablet computer, a wearable computer, a handheld computer, a personal digital assistant (PDA), a cellular telephone, a network appliance, a smart phone, an enhanced general packet radio service (EGPRS) mobile phone, or an appropriate combination of any two or more of these example data processing devices or other data processing devices.

The example environment 100 can support a client-server paradigm. For example, the computing devices 110, 112 can be clients and can communicate with one or more back-end server systems (e.g., the computing systems 102, 104, 106, 108) over the network 114. In some examples, the network 114 can be provided as a large computer network, such as a local area network (LAN), wide area network (WAN), the Internet, a cellular network, or a combination thereof connecting any number of clients and servers. In some examples, the computing systems 102, 104, 106, 108 can communicate with one another over the network 114.

In accordance with the example context, the computing system 102 can provide the computer-implemented media presentation service. For example, the computing system 102 can execute one or more computer-readable programs to provide functionality of the computer-implemented media presentation service discussed herein. The computing system 104 can provide the computer-implemented social networking service. For example, the computing system 104 can execute one or more computer-readable programs to provide functionality of the computer-implemented social networking service discussed herein. The computing system 106 can provide the computer-implemented micro-blogging service. For example, the computing system 106 can execute one or more computer-readable programs to provide functionality of the computer-implemented micro-blogging service discussed herein. The computing system 108 can provide the computer-implemented content-sharing service. For example, the computing system 108 can execute one or more computer-readable programs to provide functionality of the computer-implemented content-sharing service discussed herein.

In the example context, the user 120 can interact with each of the social networking service, the computer-implemented micro-blogging service, and the computer-implemented content-sharing service. For example, the user 120 can use the computing device 110 to interact with the social networking service provided by the computing system 104. In some examples, the user 120 can create a post that includes digital content, and can distribute the post to other users through the social networking service (e.g., the user 122 can view the post using the computing device 112). As another example, the user 120 can use the computing device 110 to interact with the micro-blogging service provided by the computing system 106. In some examples, the user 120 can create a post that includes digital content, and can distribute the post to other users through the micro-blogging service (e.g., the user 122 can view the post using the computing device 112). As another example, the user 120 can use the computing device 110 to interact with the content-sharing service provided by the computing system 108. In some examples, the user 120 can upload digital content to the content-sharing service, and the digital content can be made available to other users through the content-sharing service (e.g., the user 122 can view the digital content using the computing device 112).

In the example context, digital content can be provided on the computing device 110. For example, the user can create digital content that can be stored in memory of the computing device 110. As one example, the computing device 110 can include a camera that can be used to capture still images and/or video, which can be stored in memory of the computing device. As another example, a third-party camera can be used to capture digital content (e.g., videos, images), which can be transferred to the computing device 110, and/or distributed using one or more computer-implemented services.

In some examples, digital content can be provided as a set of digital content that includes text, one or more images, and/or one or more videos. In some examples, the set of digital content can also include ancillary content. In some examples, the ancillary content can be provided as metadata to the digital content. Example ancillary content can include a location indicator (e.g., indicating a location, from which the digital content was shared), a time indicator (e.g., indicating a time/date that the digital content was shared), one or more keywords. It is appreciated that ancillary content can include any appropriate ancillary content.

In accordance with implementations of the present disclosure, users can interact with the media presentation service provided by the computing system 102. For example, the user 120 can use the computing device 110 to interact with the media presentation service provided by the computing system 102. In some examples, the user 120 can interact with the media presentation service through a portal presented on the computing device 110. An example portal can include a web portal (e.g., one or more web pages) that is displayed on the computing device 110 using a browser application that is executed by the computing device 110. In some examples, the user 120 can interact with the media presentation service through an application that is installed on and executed by the computing device 110. For example, the application can be specific to the media presentation service (e.g., a mobile "app" provided for the presentation service).

In some examples, the user 110 enables access of the media presentation service to digital content provided through the one or more computer-implemented services, and/or the computing device 110. In some examples, the user 110 grants access to digital content stored in memory of the computing device. In some examples, the user 110 provides credentials to the media presentation service, which the media presentation service can use to access digital content associated with the user 110 in the one or more computer-implemented services. In some examples, credentials can include information that can be used to authenticate a user. Example credentials can include a username and password. In the example context, the user 110 can provide credentials for each of the social networking service, the micro-blogging service, and the content-sharing service.

In some examples, the media presentation service interfaces with each of the social networking service, the micro-blogging service, and the content-sharing service over the network 114. For example, each of the social networking service, the micro-blogging service, and the content-sharing service can expose a respective application program interface (API), through which the media presentation service can interface with the respective service. In some examples, and through the APIs, the media presentation service provides respective credentials, which the respective services can use to authenticate access to digital content associated with the user therein. If the credentials are authenticated, the media presentation service is provided access to the digital content associated with the user 110.

In accordance with implementations of the present invention, and as discussed in further detail herein, the media presentation service receives digital content from the computing device 110, and/or one or more of the social networking service, the micro-blogging service, and the content-sharing service. Accordingly, each of the computing device 110, the social networking service, the micro-blogging service, and the content-sharing service can be considered a data source, from which digital content associated with the user 110 can be received. In some examples, digital content can be received dynamically, as it is provided to each of the data sources. For example, digital content can be provided to the media presentation service at a first time. At a second time, after the first time, the user 110 can provide additional digital content (e.g., capture an image using the computing device 110). In some examples, the additional digital content can be automatically provided to the media presentation service in response to storage of the digital content in the data source. In some examples, the media presentation service can periodically poll each of the data sources for additional digital content. In some examples, the media presentation service can poll each of the data sources for additional digital content in response to a user command to retrieve any available additional digital content.

Although the media presentation service is described above as being provided by the computing system 102, it is contemplated that the media presentation service can be provided by other computing devices either alone, or in concert. For example, the media presentation service can be provided by the computing device 110 either alone, or in concert with other computing devices (e.g., the computing system 102, the computing device 112). In some examples, the computing device 110, and/or the computing device 112, may have limited computing resources (e.g., processors, memory), as compared to the computing system 102. As described in further detail, implementations of the present disclosure provide technical efficiencies, enabling more resource constrained devices to provide media presentations, as described herein.

In accordance with implementations of the present disclosure, received digital content can be processed to provide one or more media presentations that include at least some of the received digital content. In some implementations, digital content received from the one or more data sources is processed based on one or more parameters. In some examples, parameters are provided as metadata associated with the digital content. Example parameters can include time, keyword, location, and collection. For example, time can correspond to a time at and/or a time range within which digital content was created and/or distributed (e.g., in a social networking service, in a content-sharing service). Example keywords can include pre-fixed words and/or phrases, such as hashtags. In some examples, pre-fixed words/phrases enable content to be grouped and/or identified based on one or more pre-fixed words/phrases associated therewith. In some examples, location can correspond to a location at and/or from which digital content was created and/or distributed (e.g., in a social networking service, in a content-sharing service). In some examples, a collection can include a user-made grouping of digital content (e.g., an "album" of photos). Although example parameters are provided above, it is appreciated that any appropriate parameters can be used.

In some examples, a superset of digital content is received by the media presentation service, and the media presentation service groups the digital content in one or more groups based on the one or more parameters. In some examples, each group provides a set of digital content. For example, a first group can be provided based on time (e.g., a time range), and any digital content that corresponds to the time can be included in the first group. As another example, a second group can be provided based on a particular location, and any digital content that corresponds to the particular location can be included in the second group. As another example, a third group can be provided based on a particular keyword, and any digital content associated with the particular keyword can be included in the third group. For example, it can be determined that at least some of the digital content is associated with the particular keyword, and in response, the third group can be provided, the remainder of the digital content can be reviewed for the keyword, and any additional digital content that is associated with the keyword can also be included in the third group. As another example, a fourth group can be provided based on a particular collection, and any digital content associated with the particular collection can be included in the fourth group. For example, it can be determined that the user created an album in the content-sharing service, and in response, the fourth group can be provided and can include the digital content of the album.

In some examples, digital content can be included in one or more groups. For example, a particular item of digital content can be associated with the time and the particular keyword. Consequently, the particular item of digital content can be included in the first group and the third group.

In some examples, a group can include digital content from multiple data sources. For example, a group can include digital content from the computing device, the social networking service, and the content-sharing service. Consequently, a group can be considered an aggregation of digital content across multiple data sources, at least one data source including a computer-implemented service.

In accordance with implementations of the present disclosure, a media presentation is created for each group. In some examples, the media presentation is automatically created for a particular group. For example, in response to the user granting access to at least one data source, one or more groups of digital content are provided, and respective one or more media presentations are created. That is, and in some examples, additional user input (e.g., beyond grant of access to at least one data source), is not required for provision of the one or more media presentations. In this manner, the user can be quickly provided with one or more media presentations absent additional user input to create and/or request a media presentation.

In some implementations, items of digital content in a group of digital content can be filtered to provide a sub-set of items of digital content that is to be included in a respective presentation. In some examples, items can be filtered based on one or more quality indicators. In some examples, an item that does not correspond to or meet thresholds of the one or more quality indicators is not included in the set of digital content for the respective presentation. For example, each item of digital content can have at least one score associated therewith (e.g., a quality score). In some examples, if the at least one score is below a respective score threshold, the respective item of digital content is not included in the sub-set of digital content.

In some examples, a score (e.g., quality score) can be provided based on one or more factors associated with the respective item of digital content. Example factors can include the make-up of the digital content, interactions of users with the digital content, and time. For example, the make-up of an item of digital content can include text, image and/or video provided in the digital content. In some examples, an item of digital content that only has text can be scored lower than an item of digital content that has both text and an image. As another example, interactions of users with an item of digital content can include comments, shares, and/or "likes" of the item of digital content (e.g., other users can comment on, share and/or "like" an item of digital content within the computer-implemented service, from which the item of digital content was received). In some examples, an item of digital content that has no comments, shares and/or "likes" can be scored lower than an item of digital content that has comments, shared and/or "likes." As another example, and with respect to time, a more recent item of digital content can be scored higher than a less recent item of digital content. In some examples, the score can be provided based on multiple factors. For example, multiple sub-scores can be provided, each sub-score being specific to a respective factor, and the sub-scores can be combined to provide the score (e.g., sum of scores, average of scores, weighted average of scores).

In some implementations, a score associated with an item of digital content can change over time (e.g., dynamic score). For example, the item of digital content can have a first score at a first time. Over time, however, the item of digital content can, for example, be increasingly commented on, shared, and/or "liked." Consequently, at a second time, the item of digital content can have a second score that is higher than the first. In this manner, a sub-set of digital content can be dynamic. For example, the item of digital content may not have been included in the sub-set of digital content at the first time in view of the first score being below a threshold, but can be included in the sub-set of digital content at the second time in view of the second score being above the threshold. In some examples, the second score can be less than the first score (e.g., the item of digital content is older, and thus the score decreases based on age). Also, in this manner, the sub-set of digital content can be dynamic. For example, the item of digital content may be included in the sub-set of digital content at the first time in view of the first score being above the threshold, but is not included in the sub-set of digital content at the second time in view of the second score being below the threshold.

In some implementations, a media presentation can include a maximum number of items of digital content that can be included. In some examples, the sub-set of items that are to be included in the media presentation can include more items than the maximum number of items. In some examples, the number of items in the sub-set of items can be reduced to the maximum number. For example, quality thresholds can be increased, such that the sub-set of items does not include items that would have otherwise been included. In some examples, items of the sub-set of items are cycled through the media presentation, such that, at any given time, the number of items provided in the media presentation does not exceed the maximum number of items. In this manner, each item of the sub-set of items can be included in the media presentation without exceeding the maximum number of items.

In some implementations, a media presentation can include a minimum number of items of digital content that should be included. In some examples, the sub-set of items that are to be included in the media presentation can include less items than the minimum number of items. In some examples, the number of items in the sub-set of items can be increased to the maximum number. For example, quality thresholds can be reduced, such that the sub-set of items includes items that would have otherwise been filtered. In some examples, items of the sub-set of items are recycled through the presentation, such that one or more items can be redundantly displayed in the presentation.

Implementations of the present disclosure also provide for removal of redundant digital content from a sub-set of digital content, and/or preventing redundant digital content from being added to a sub-set of digital content. In some implementations, first digital content and second digital content can be identical (e.g., the first digital content and the second digital content are redundant with respect to each other). Consequently, the inclusion of both the first digital content and the second digital content can result in more digital content being included in a sub-set of digital content than desired. For example, the sub-set of digital content may be larger, if it includes both the first digital content and the second digital content than if it includes only one of the first digital content or the second digital content. This can result in a burden on technical resources in terms of, for example, processing power, memory, and/or bandwidth (e.g., transmitting and/or processing the sub-set of digital content for display as a media presentation).

In view of this, implementations of the present disclosure avoid redundant digital content from being included in a sub-set of digital content. In some implementations, and as described in further detail herein, redundant digital content can be automatically identified based on metadata (e.g., parameters). In some implementations, digital content is clustered based on respective metadata, and the clusters are used to select digital content for inclusion in the sub-set of digital content. In this manner, and as described in further detail herein, inclusion of redundant media content can be mitigated.

In further detail, metadata of digital content of one or more data sources can be scanned to determine, for example, time, location, and type (e.g., among other example parameters). In some examples, the digital content is divided into a plurality of clusters based on, for example, time and location. In some examples, digital content that is captured at the same time, and/or within a threshold time with respect to each other is included in a cluster. In some examples, digital content that is captured at the same location, and/or within a threshold distance of each other is included in a cluster.

In some implementations, a hierarchy of clusters can be provided. For example, clusters can include higher-level clusters and lower-level clusters. Example levels can include a moment, and a scene. In some examples, a moment is considered to be a higher-level cluster with respect to a scene, which can be considered a lower-level cluster. For example, a moment can include a plurality of scenes that have some commonality in terms of time, duration, and/or location. In some examples, time may include time of day (e.g., 10:15 AM) and date (e.g., Sep. 1, 2016). In some examples, duration (e.g., of a video) can include seconds, minutes, hours. In some examples, time and/or duration can be provided in terms of seconds, minutes, hours, days, weeks, months, years, and so on. In some implementations, a scene can include an instant in time, or a relatively short segment of time at the same (or approximately the same) location. For example, a moment can include a video captured during a day at different skate parks, and scenes can include segments of the video, each scene corresponding to a respective skate park. In this example, digital content can be selected for respective skate parks using scenes.

In some implementations, the hierarchy of the clusters can change. For example, clusters can change, such that a desired number of digital content in clusters can be achieved. In some examples, a hierarchy of the clusters may be dynamically determined. For example, metadata can be used to determine a number of digital content that would be included in a cluster. In some examples, a metadata value can be selected for a cluster, and a number of digital content that would be included based on the metadata value can be determined. The number can be compared to a threshold number (or a threshold range). If the number does not meet threshold number (or is not within the threshold range), the metadata value can be changed, and a new number of digital content can be determined.

Implementations of changing the hierarchy of clusters is described in further detail with reference to time as the metadata. In some examples, month can be selected as an initial metadata value, and a number of digital content that would be included in a cluster corresponding to month can be determined. The number can be compared to a threshold number (or a threshold range). It can be determined that the number exceeds the threshold number (or exceeds the higher end of the threshold range), such that more digital content would be included in the cluster than desired. Consequently, the metadata value can be changed (e.g., to week instead of month), and a new number of digital content can be determined. In this manner, it can be determined, for example, that the largest cluster corresponds to week (e.g., as opposed to month, which would result in too many digital content being included in the largest cluster).

In some implementations, a higher-level cluster can be sub-divided into lower-level clusters. For example, the largest cluster may correspond to week, and may be subdivided into days. In some examples, each day cluster can be further sub-divided (e.g., based on nearness of capture time and/or capture location of the digital content therein). As another example, the largest cluster may correspond to capture location of Europe, and can be sub-divided into different countries. Each country cluster can be sub-divided into different regions/cities inside the countries, and/or different days/amount of time within the countries.

In some implementations, clustering of digital content can be iterative. For example, digital content can be re-clustered as new digital content is made available (e.g., as digital content is added to the one or more sources). For example, when new images are detected in the camera roll of a device, the images can be incrementally added to the existing cluster structure of digital content, instead of re-computing the entire cluster structure from scratch. In this manner, computing resources can be conserved. For example, A is a set of digital content, for which a cluster structure can be determined. B is a set of digital content, which includes digital content that was created after creation of the cluster structure of the digital content of A. Adding B to the cluster structure of A results in the same cluster structure as clustering the union of A+B.

In some implementations, the entire set of new digital content is not incorporated into the existing cluster. For example, the most recently created digital content (e.g., digital content that was created within a threshold time) can remain un-clustered in case the digital content is part of an ongoing moment that is being captured.

In accordance with implementations of the present disclosure, a particular item of digital content can be selected from respective clusters for inclusion in a media presentation. In some implementations, a goodness measure (e.g., provided as a numerical value) is determined for each item of digital content within a cluster, and one item of digital content is selected based on the goodness measures. In some examples, the goodness measure indicates a quality of the respective digital content.

Examples of the goodness measure are described in further detail with reference to images and/or video as the digital content. In some examples, a goodness measure can be provided based on parameters including, but not limited to, duration, resolution, brightness, contrast, color histogram, blur/sharpness, number of human faces in the digital content, and/or the device that created/captured the digital content (e.g., model of camera, smartphone). In some examples, values for one or more parameters can be provided as metadata associated with the digital content. In some examples, values for one or more parameters can be provided by processing the digital content (or at least a portion of the digital content), as described in further detail herein.

In some examples, the goodness measure can be calculated as a weighted average of the parameter values. In some examples, parameters can be weighted to change their influence on the goodness measure. For example, a first parameter can be weighted more heavily than a second parameter, such that the first parameter influences the goodness measure more than the second parameter. In some examples, digital content that is absent values for certain parameters (e.g., no metadata is associated with the digital content for a particular parameter) can result in a relatively lower goodness measure with respect to other digital content. In some examples, a goodness measure is not determined for digital content that does not include any metadata associated therewith (e.g., the goodness measure can be automatically set equal to a minimum value). In some examples, if an item of digital content does not include metadata, the digital content is removed from its respective cluster(s).

In some implementations, the goodness measure of an item of digital content can be determined based on a smaller (e.g., lower resolution, thumbnail) version of the item of digital content. In some examples, digital content can be processed to provide the smaller version. For example, data underlying the digital content can be filtered (e.g., by a predetermined %) to provide the smaller version having less data than the original content. In some examples, determining the goodness measure based on the smaller version improves the use of computing resources, as less data need be processed to provide the goodness measure.

In some implementations, one or more items of digital content can be selected from a cluster for inclusion in a media presentation based on respective goodness measures. In some examples, a single item of digital content is selected from each cluster. In some examples, multiple items of digital content (e.g., 2, 3, 4, 5, . . . ) are selected from each cluster. In some examples, the number of items of digital content selected from a particular cluster can be based on the size of the cluster. For example, a first cluster can have a first number of items of digital content selected therefrom, and a second cluster, which is smaller than the first cluster, can have a second number of items of digital content selected therefrom, the second number of items being less than the first number of items.

In some implementations, goodness measures are compared to a threshold goodness measure to determine whether particular items of digital content are to be selected from a cluster for inclusion in the media presentation. In some examples, if the goodness measure meets the threshold goodness measure (e.g., is greater than or equal to), the underlying item of digital content can be selected for inclusion in the media presentation.

In some implementations, although multiple items of digital content could be selected from a cluster for inclusion in the media presentation, it can be determined that a sub-set (e.g., 1) of the multiple items of digital content is actually selected. For example, a cluster of digital content can include redundant digital content (e.g., the same image multiple times). This can occur, for example, when multiple copies of digital content are included in a source (e.g., device), and/or when digital content is shared from one source to one or more other sources (e.g., digital content stored on a device is posted to one or more social networking services). In some examples, an overlap in metadata values and a difference in goodness measures can be determined, and the digital content can be identified as redundant digital content based thereon. For example, if two items of digital content include the same, or approximately the same metadata (e.g., the overlap in metadata exceeds a threshold overlap), and the same, or approximately the same goodness measure (e.g., the difference in goodness measures is less than a threshold difference), the two items of digital content can be determined to be redundant. Consequently, only one of the items of digital content is selected for inclusion in the media presentation.

In some implementations, goodness measures and closeness (e.g., in terms of metadata overlap) can be inversely related, as between two items of digital content. In some examples, although two items of digital content might otherwise be determined to be redundant (e.g., the overlap in metadata exceeds a threshold overlap, and the difference in goodness measures is less than a threshold difference), if the goodness measures exceed a threshold goodness measure, both items of digital content may be anyway selected for inclusion in the media presentation. In other words, although the items of digital content might be redundant, their respective qualities are sufficiently high, such that both are selected for inclusion in the media presentation.

In some implementations, selection of which digital content to include in a media presentation can be based on user input. In some examples, a user can provide user input indicating parameters and/or quality for selection of digital content to be included in a media presentation. For example, the user can indicate a particular time, date, location, and/or type of digital content to be included in the media presentation. As another example, the user can indicate a minimum goodness measure for digital content that is to be included in the media presentation.

In some implementations, a notification is provided to the user when a media presentation is available. In some examples, a low-resolution version of the media presentation can be initially provided. For example, the low-resolution media presentation can include lower-resolution version of digital content, and/or a reduced number of digital content. In this manner, providing the low-resolution version of the media presentation can consume reduced resources (e.g., processors, memory, bandwidth), as compared to the full (e.g., high-resolution) media presentation. In some examples, the user can provide user input indicating a request for the full media presentation, which is provided in response to the user input.

Implementations of the present disclosure further provide processing modes based on different phases of media gradation that can occur at different times. In some implementations, a light processing mode (e.g., metadata, face, histograms), and a heavy processing mode (e.g., blur, faces) are provided. In some implementations, the light processing includes processing of digital content that is performed before any media presentation is provided (e.g., suggested) to the user. In some examples, processing in the light processing mode is performed on lower-resolution digital content of more robust digital content (e.g., processing a thumbnail of an image). In some implementations, results of the light processing mode can be used to determine whether a sufficient number of media of sufficient quality is available to provide a media presentation. In some implementations, if the results of the light processing mode indicate that a sufficient number of media of sufficient quality is available, the full digital content can be retrieved and processed to provide a media presentation. In some examples, processing in the heavy processing is performed to provide a more precise quality grade when making the selection of digital content to be included in the media presentation.

In accordance with implementations of the present disclosure, the media presentation includes digital content of a respective sub-set of digital content. In some implementations, the media presentation can be provided based on a theme. In some examples, the theme can be one of a plurality of themes. In general, a theme defines the look and/or impression of the media presentation. In some examples, a theme can define a color palette used in the presentation, and/or a manner in which digital content is displayed. In some examples, digital content can be displayed within frames of the media presentation, where the theme defines a shape of the frame (e.g., square, rectangular, circular, oval, triangular, rhombus, cubical, spherical). In some examples, the theme defines how the digital content is introduced for display (e.g., fade-in, pixel-in (an increasing number of pixels are displayed until the full digital content is displayed), slide-in (from an edge of the display). In some examples, the theme defines how the digital content is removed from display (e.g., fade-out, pixel-out (a decreasing number of pixels are displayed until the digital content is no longer displayed), slide-out (to an edge of the display). In some examples, the theme defines a number of items of digital content that are concurrently displayed. In some examples, only a single item of digital content is displayed at any one time. In some examples, multiple items of digital content can be displayed at the same time.

In some implementations, the media presentation includes sound. In some examples, the sound includes music. In some examples, the music can include default music. In some examples, the music can include music that is provided by the user (e.g., music that is stored on the computing device 110). In some examples, the music can include music that is provided by the presentation service. In some examples, the music can include music that is provided by a music service (e.g., a music-streaming service).

In some examples, the media presentation is displayed to one or more users (e.g., on a display of the computing device 110, 112). For example, the media presentation can be displayed on the computing device 110 for viewing by the user 120. In some examples, the media presentation can be made available for viewing by other users. For example, the media presentation can be made available for display on the computing device 112 for display to the user 122. In some examples, the user, for which the media presentation is created (e.g., the user 110) can share the media presentation by selecting a share command provided by the media presentation service. In some examples, and in response to the share command one or more share options can be presented to the user. Example share options can include sharing through the media presentation service, sharing through an electronic message (e.g., an email), and sharing through a computer-implemented service. In some examples, the user can identify one or more other users, with which the media presentation is to be shared. For example, the user can select an email share option and can provide one or more email addresses for respective users, with which the presentation is to be shared (e.g., an email is sent that includes a link to the presentation).

In some implementations, the media presentation can be duplicated (e.g., copied). In some examples, a duplicate media presentation is static, such that it is not automatically updated as underlying digital content changes. In this manner, the duplicate presentation captures the original media presentation at a moment in time (e.g., before subsequent changes occur to the underlying digital content).

In some implementations, the media presentation can facilitate interactions of the user observing the media presentation with the digital content underlying the presentation. For example, and as discussed above, items of digital content that are included in the media presentations can include interactions associated therewith. Example interactions can include comments, shares, and/or "likes" of the item of digital content (e.g., users can comment on, share and/or "like" an item of digital content within the computer-implemented service, from which the item of digital content was received). Consequently, the media presentation can display an item of digital content and one or more interactions associated with the item. In some examples, a user observing the media presentation may wish to interact with the item and/or interactions. For example, the user may observe an item that the user wishes to comment on, share, and/or "like." Accordingly, implementations of the present disclosure provide interaction elements that can be provided within the media presentation to enable the user to interact with items of digital content. In some examples, the user's interaction can be directly recorded in the media presentation, such that the interaction is displayed in the media presentation and/or subsequent displays of the media presentation. In some examples, the user's interaction is fed back to the data source, from which the item of digital content originated. For example, a media presentation can include an image provided from a social networking service. The user observing the media presentation can input a comment to the image, which comment can be fed back to the social networking service. Consequently, the comment can be included in subsequent displays of the image within the social networking service.

In some implementations, the media presentation can be automatically updated based on changes to digital content from the one or more data sources underlying the media presentation. In some examples, digital content provided in the sub-set of digital content underlying the media presentation can change. For example, after the media presentation is initially created, an item of digital content can be added to the sub-set of digital content underlying the media presentation. Consequently, the media presentation can subsequently include the added item of digital content. As another example, after the media presentation is initially created, an item of digital content can be removed from the sub-set of digital content underlying the media presentation. Consequently, the media presentation can subsequently be absent of the removed item of digital content. As another example, after the media presentation is initially created, one or more interactions can occur with items of digital content within the underlying data source(s) (e.g., user can comment on an image within a social networking service, which image is provided in the media presentation from the social networking service). Consequently, items and/or interactions associated therewith can be updated within the media presentation to include the subsequent interactions. In some examples, updating of a presentation can occur in real-time (e.g., as one or more users are viewing the presentation).

In some implementations, a user can edit a media presentation. In some examples, and as discussed above, a media presentation can be automatically provided. In some examples, the user can edit the presentation by adding and/or removing items of digital content to/from the media presentation, changing the theme of the media presentation, and/or adding and/or removing music that is to play during presentation of the media presentation.

In some implementations, a user can manually create media presentations. In some examples, items of digital content that are available for presentations can be displayed to the user. In some examples, the user can select individual items that are to be included in the subject presentation. In some examples, the user can select the theme of the presentation, and music that is to be played during the presentation.

Figure 2:
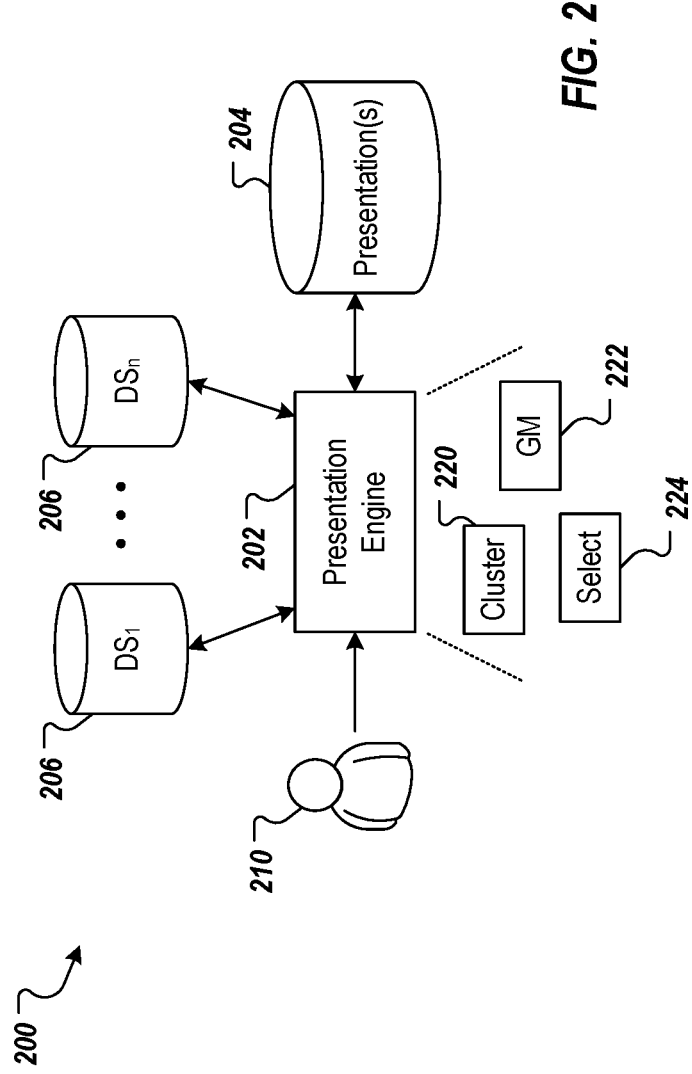
FIG. 2 depicts an example environment to provide media presentations based on digital content from one or more data sources.

FIG. 2 depicts an example environment 200 to provide media presentations based on digital content from one or more data sources. The example environment 200 includes a presentation engine 202, a presentation data store 204, and a plurality of data sources ($DS_1$, . . . , $DS_n$) 206. In some examples, the presentation engine 202 and the presentation data store 204 are provided by a computing system (e.g., the computing system 102 of FIG. 1). In some examples, the presentation engine 202 is provided as one or more computer-executable programs that can be executed to provide functionality discussed herein. In some examples, one or more data sources 206 are associated with respective computer-implemented services. In some examples, one or more data sources 206 are provided from respective computing devices (e.g., the computing device 110). In some examples, the presentation engine 202 receives digital content from one or more of the data sources 206 (e.g., over the network 114 of FIG. 1, through respective APIs).

In some implementations, a user 210 provides input to the presentation engine 202. For example, the user can provide one or more credentials to the presentation engine 202, which credentials the presentation engine 202 can use to access the one or more data sources 206. In some examples, the user 210 can provide input to share one or more media presentations with one or more other users, as discussed above. In some examples, the user 210 can provide input to modify a media presentation, as discussed above. In some examples, the user 210 can provide input to create a media presentation, as discussed above.

In some examples, media presentations provided through the presentation engine 202 are stored in the presentation store 204. In some examples, the presentation engine 202 can access a stored media presentation to update the media presentation, as discussed above.

In the depicted example, the presentation engine 202 includes a cluster module 220, a goodness measure (GM) module 222, and a selection module 224. In some examples, the cluster module 220 clusters digital content received from the one or more data sources 206, as described herein. In some examples, the goodness measure module 222 processes the digital content to provide respective goodness measures for one or more items of digital content, as described herein. In some examples, the selection module 224 selects items of digital content for inclusion in a media presentation, as described herein.

Figure 3:
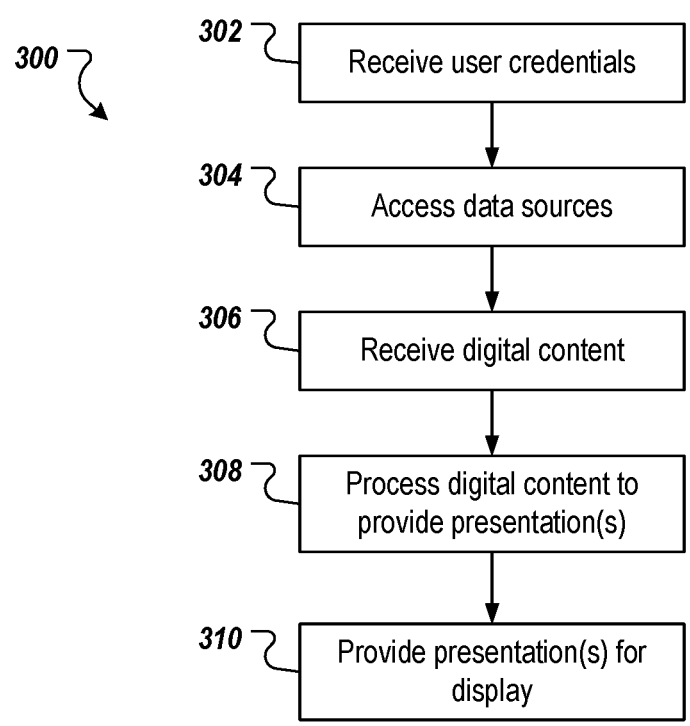
FIG. 3 depicts an example process that can be executed in accordance with implementations of the present disclosure.

FIG. 3 depicts an example process 300 that can be executed in accordance with implementations of the present disclosure. The example process 300 can be implemented, for example, by the computing system 102 of FIG. 1. In some examples, the example process 300 can be provided by one or more computer-executable programs executed using one or more computing devices. In some implementations, the example process 300 is performed to provide one or more presentations.

User credentials associated with a user are received (302). For example, for each data source of a plurality of data sources, respective user credentials can be received from the user. One or more data sources are accessed based on the user credentials (304). For example, a presentation service can access a data source based on the user credentials (e.g., through an API). In some examples, at least one data source includes a computer-implemented service used by the user. A plurality of digital content is received from the one or more data sources (306). For example, the presentation service can receive items of digital content and any associated interactions from respective data sources. The plurality of digital content is processed to provide one or more presentations (308). In some examples, the plurality of digital content is processed to provide a sub-set of digital content, and each presentation includes items of digital content of the sub-set of digital content. The one or more presentations are provided for display on a computing device of the user (310).

In some implementations, one or more actions can be performed automatically (i.e., without requiring user input). In some examples, one or more of the actions 304, 306, 308, 310 can be automatically performed. In some examples, the one or more actions 304, 306, 308, 310 are automatically performed in response to receiving the user credentials. In this manner, the user provides the credentials and is provided one or more presentations without requiring any additional user activity.

Figure 4:
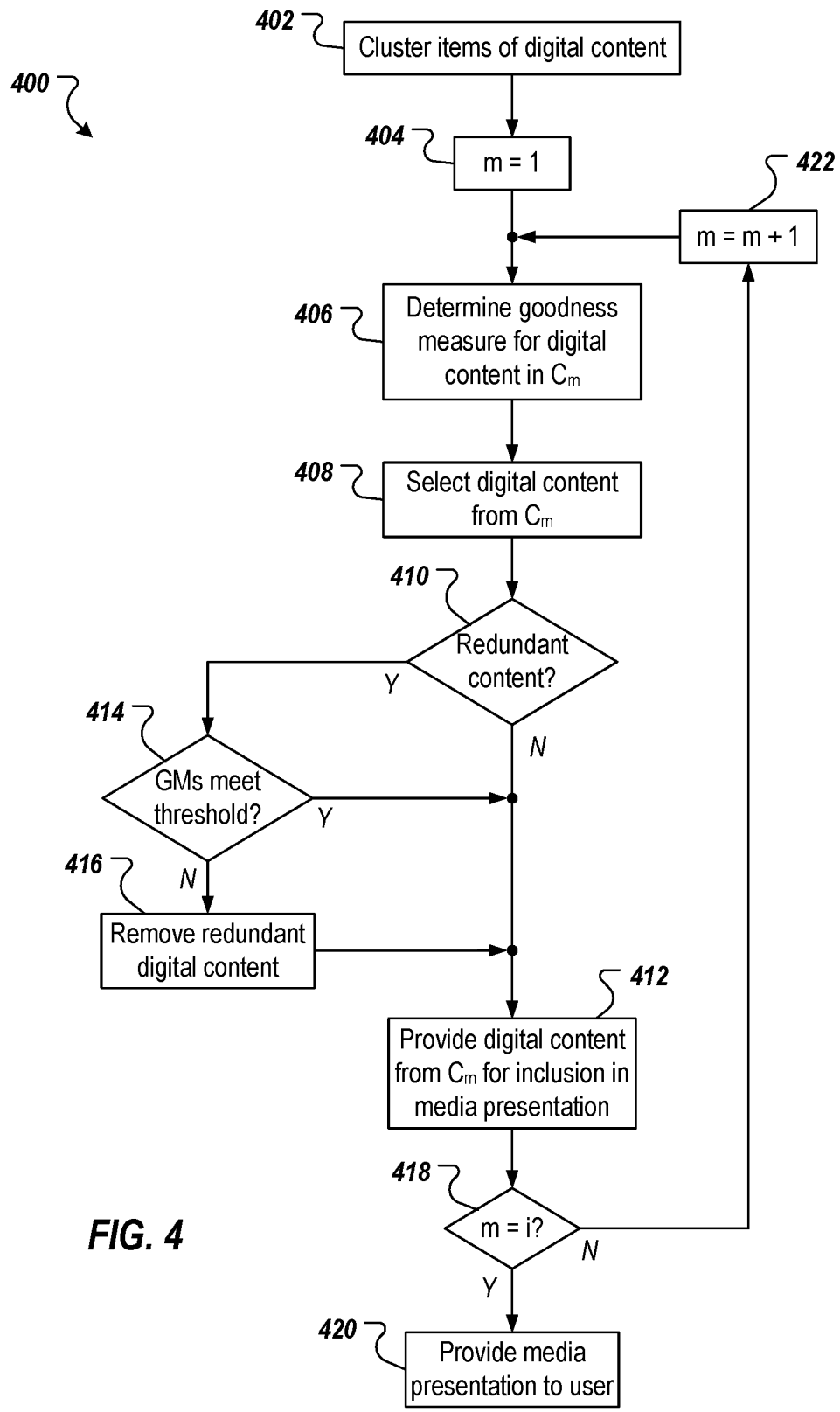
FIG. 4 depicts an example process that can be executed in accordance with implementations of the present disclosure.

FIG. 4 depicts an example process 400 that can be executed in accordance with implementations of the present disclosure. The example process 400 can be implemented, for example, by the computing system 102, and/or the device 110, 112 of FIG. 1 (e.g., executing the presentation engine 202 of FIG. 2). In some examples, the example process 400 can be provided by one or more computer-executable programs executed using one or more computing devices. In some implementations, the example process 400 is performed to select digital content for inclusion in a media presentation.

Items of digital content are clustered (402). For example, the cluster module 220 clusters items of digital content received from the one or more sources 206, as described herein, to provide a set of clusters $C_1$, . . . , $C_i$. In some examples, each set of clusters $C_1$, . . . , $C_i$ includes one or more items of digital content. A counter m is set equal to 1 (404). Goodness measures are determined for each item of digital content within the cluster $C_m$ (406). For example, the goodness measure module 222 of FIG. 2 provides a goodness measure for each item of digital content within the cluster $C_m$, as described herein.

Digital content is selected from the cluster $C_m$ (408) for potential inclusion in a media presentation. For example, the selection module 224 of FIG. 2 selects one or more items of digital content from the cluster $C_m$ for potential inclusion in the media presentation, as described herein (e.g., based on goodness measures, user input). It is determined whether redundant content is included in the selected digital content (410). For example, if two or more items of digital content are selected (e.g., in 408), metadata and goodness measures can be compared between items of digital content to identify items of digital content as redundant (e.g., the overlap in metadata exceeds a threshold overlap, and the difference in goodness measures is less than a threshold difference). If none of the digital content is determined to be redundant, the digital content selected from the cluster $C_m$ is provided for inclusion in the media presentation (412).

If at least two items of digital content are determined to be redundant, it is determined whether the respective goodness measures exceed a threshold goodness measure (414). If the goodness measures exceed the threshold goodness measure, the redundant items of digital content are provided for inclusion in the media presentation (412). In other words, although the items of digital content might be redundant, their respective qualities are sufficiently high, such that they are selected for inclusion in the media presentation. If at least one of the goodness measures does not exceed the threshold goodness measure, redundant digital content is removed (416) (e.g., digital content having the lower goodness measure).

It is determined whether the counter m is equal to i (418). If the counter m is not equal to i, all of the sets of clusters $C_1, \ldots, C_i$ have not been processed. Consequently, the counter m is incremented (422), and the example process loops back. If the counter m is equal to i, all of the sets of clusters $C_1, \ldots, C_i$ have been processed. Consequently, the media presentation, which includes digital content from the sets of clusters $C_1, \ldots, C_i$, is provided to the user.

Implementations of the present disclosure achieve one or more of the following example advantages. In some examples, resources (e.g., processors, memory, bandwidth) are conserved. For example, by removing relatively lower quality digital content, media presentations can be leaner, requiring less resources to provide media presentations to the user.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs (i.e., one or more modules of computer program instructions) encoded on computer storage medium for execution by, or to control the operation of, data processing apparatus. Alternatively or in addition, the program instructions can be encoded on an artificially-generated propagated signal (e.g., a machine-generated electrical, optical, or electromagnetic signal) that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer can include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementation of the present disclosure or of what may be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for selecting digital content to be included in a media presentation, the method being executed using one or more processors and comprising:

receiving, by the one or more processors, items of digital content from one or more data sources associated with a user;

clustering, by the one or more processors, the items of digital content into a hierarchy of clusters, the hierarchy of clusters including moment clusters and scene clusters, individual moment clusters including two or more of the scene clusters, and individual scene clusters including one or more of the items of digital content;

determining, by the one or more processors, a goodness measure for each item of digital content within the individual scene clusters, the goodness measure indicating a quality of a respective item of digital content, the goodness measure being at least partially based on metadata associated with the respective item of digital content;

identifying, by the one or more processors, at least one item of digital content from the individual scene clusters based on the goodness measure;

selecting, by the one or more processors, a plurality of the identified items of digital content from the individual moment clusters for inclusion in the media presentation;

identifying, by the one or more processors, two or more of the selected items of digital content as redundant digital content based on overlap between the metadata associated with the respective item of digital content such that a first item of digital content is identified as being redundant of a second item of digital content based on overlap between the metadata associated with the first item of digital content and the metadata associated with the second item of digital content;

removing, by the one or more processors, an item of redundant digital content from inclusion in the media presentation based on the quality of the item of redundant digital content indicated by the goodness measure not being sufficiently high such that one of the first item of digital content and the second item of digital content is removed from inclusion in the media presentation based on a first goodness measure of the first item of digital content and a second goodness measure of the second item of digital content not exceeding a threshold goodness measure while both the first item of digital content and the second item of digital content are retained for inclusion in the media presentation based on the first goodness measure of the first item of digital content and the second goodness measure of the second item of digital content exceeding the threshold goodness measure, wherein the first goodness measure of the first item of digital content and the second goodness measure of the second item of digital content exceeding the threshold goodness measure indicates that the qualities of the first item of digital content and the second item of digital content are sufficiently high such that that removal of the item of redundant digital content from inclusion in the media presentation is not performed for the first item of digital content and the second item of digital content; and providing, by the one or more processors, the media presentation for display on a computing device of the user, the media presentation comprising at least one selected item of digital content.

2. The method of claim 1, wherein identifying two or more of the selected items of digital content as redundant digital content is performed based on one or more of an overlap in the metadata, and a difference in respective goodness measures.

3. The method of claim 1, wherein the goodness measure is further determined based on content of the respective item of digital content.

4. The method of claim 1, wherein the metadata comprises time, location, duration, keyword, and type.

5. The method of claim 1, wherein items of digital content comprise images, videos or text.

6. The method of claim 1, wherein at least one data source is associated with a computer-implemented service accessed by the user.

7. The method of claim 1, wherein at least one data source comprises the computing device of the user.

8. The method of claim 1, wherein the individual moment clusters correspond to a period of time, and the individual scene clusters correspond to a sub-period of time.

9. The method of claim 8, wherein the period of time corresponding to the individual moment clusters is changed based on a number of items of digital content within one or more of the moment clusters.

10. The method of claim 1, wherein the individual moment clusters correspond to a geographic area, and the individual scene clusters correspond to a sub-geographic area.

11. The method of claim 10, wherein the geographic area corresponding to the individual moment clusters is changed based on a number of items of digital content within one or more of the moment clusters.

12. The method of claim 1, wherein a number of items of digital content selected from the individual moment clusters for inclusion in the media presentation is based on sizes of the individual moment clusters.

13. The method of claim 1, wherein metadata associated with the respective item of digital content includes values for brightness, contrast, color histogram, blur/sharpness, and/or number of human faces in the respective item of digital content, and the goodness measure for the respective item of digital content is determined based on the values for brightness, contrast, blur/sharpness, and/or number of human faces.

14. The method of claim 13, wherein the goodness measure for the respective item of digital content is determined based on a weighted average of the values for brightness, contrast, blur/sharpness, and/or number of human faces.

15. The method of claim 1, wherein the goodness measure for the respective item of digital content is set to a minimum value based on the metadata associated with the respective item of digital content not including any values for brightness, contrast, color histogram, blur/sharpness, or number of human faces in the respective item of digital content.

16. The method of claim 1, wherein the respective item of digital content is removed from a respective cluster based on the metadata associated with the respective item of digital content not including any values for brightness, contrast, color histogram, blur/sharpness, or number of human faces in the respective item of digital content.

17. The method of claim 1, wherein the two or more of the selected items of digital content are identified as redundant digital content based on the overlap between the metadata associated with the respective item of digital content exceeding a threshold overlap.

18. The method of claim 17, wherein the two or more of the selected items of digital content are identified as redundant digital content further based on a difference in the goodness measure of the respective items of redundant digital content being less than a threshold difference.

19. A system comprising:

a data store for storing data; and one or more processors configured to interact with the data store, the one or more processors being further configured to perform operations f comprising:

receiving items of digital content from one or more data sources associated with a user;

clustering the items of digital content into a hierarchy of clusters, the hierarchy of clusters including moment clusters and scene clusters, individual moment clusters including two or more of the scene clusters, and individual scene clusters including one or more of the items of digital content;

determining a goodness measure for each item of digital content within the individual scene clusters, the goodness measure indicating a quality of a respective item of digital content, the goodness measure being at least partially based on metadata associated with the respective item of digital content;

identifying at least one item of digital content from the individual scene clusters based on the goodness measure;

selecting a plurality of the identified items of digital content from the individual moment clusters for inclusion in the media presentation;

identifying two or more of the selected items of digital content as redundant digital content based on overlap between the metadata associated with the respective item of digital content such that a first item of digital content is identified as being redundant of a second item of digital content based on overlap between the metadata associated with the first item of digital content and the metadata associated with the second item of digital content;

removing an item of redundant digital content from inclusion in the media presentation based on the quality of the item of redundant digital content indicated by the goodness measure not being sufficiently high such that one of the first item of digital content and the second item of digital content is removed from inclusion in the media presentation based on a first goodness measure of the first item of digital content and a second goodness measure of the second item of digital content not exceeding a threshold goodness measure while both the first item of digital content and the second item of digital content are retained for inclusion in the media presentation based on the first goodness measure of the first item of digital content and the second goodness measure of the second item of digital content exceeding the threshold goodness measure, wherein the first goodness measure of the first item of digital content and the second goodness measure of the second item of digital content exceeding the threshold goodness measure indicates that the qualities of the first item of digital content and the second item of digital content are sufficiently high such that removal of the item of redundant digital content from inclusion in the media presentation is not performed for the first item of digital content and the second item of digital content; and providing the media presentation for display on a computing device of the user, the media presentation comprising at least one selected item of digital content.

20. A non-transitory computer readable medium storing instructions that, when executed by one or more processors, cause the one or more processors to perform operations comprising:

receiving items of digital content from one or more data sources associated with a user;

clustering the items of digital content into a hierarchy of clusters, the hierarchy of clusters including moment clusters and scene clusters, individual moment clusters including two or more of the scene clusters, and individual scene clusters including one or more of the items of digital content;

determining a goodness measure for each item of digital content within the individual scene clusters, the goodness measure indicating a quality of a respective item of digital content, the goodness measure being at least partially based on metadata associated with the respective item of digital content;

identifying at least one item of digital content from the individual scene clusters based on the goodness measure;

selecting a plurality of the identified items of digital content from the individual moment clusters for inclusion in the media presentation;

identifying two or more of the selected items of digital content as redundant digital content based on overlap between the metadata associated with the respective item of digital content such that a first item of digital content is identified as being redundant of a second item of digital content based on overlap between the metadata associated with the first item of digital content and the metadata associated with the second item of digital content;

removing an item of redundant digital content from inclusion in the media presentation based on the quality of the item of redundant digital content indicated by the goodness measure not being sufficiently high such that one of the first item of digital content and the second item of digital content is removed from inclusion in the media presentation based on a first goodness measure of the first item of digital content and a second goodness measure of the second item of digital content not exceeding a threshold goodness measure while both the first item of digital content and the second item of digital content are retained for inclusion in the media presentation based on the first goodness measure of the first item of digital content and the second goodness measure of the second item of digital content exceeding the threshold goodness measure, wherein the first goodness measure of the first item of digital content and the second goodness measure of the second item of digital content exceeding the threshold goodness measure indicates that the qualities of the first item of digital content and the second item of digital content are sufficiently high such that removal of the item of redundant digital content from inclusion in the media presentation is not performed for the first item of digital content and the second item of digital content; and providing the media presentation for display on a computing device of the user, the media presentation comprising at least one selected item of digital content.

* * * * *